United States Patent [19]
Jäger

[11] Patent Number: 4,842,779
[45] Date of Patent: Jun. 27, 1989

[54] DEVICE FOR AERATING WATER

[75] Inventor: Sebastian Jäger, Burgdorf, Fed. Rep. of Germany

[73] Assignee: Arnold Jäger, Burgdorf, Fed. Rep. of Germany

[21] Appl. No.: 175,528

[22] Filed: Mar. 31, 1988

[30] Foreign Application Priority Data

Apr. 1, 1987 [DE] Fed. Rep. of Germany ... 3710910[U]

[51] Int. Cl.[4] .......... B01F 3/04

[52] U.S. Cl. .......... 261/122; 210/220; 261/124

[58] Field of Search .......... 261/122, 124; 239/145; 210/220, 221.2

[56] References Cited

U.S. PATENT DOCUMENTS

| | | | |
|---|---|---|---|
| 1,223,033 | 4/1917 | Cole | 261/122 |
| 1,908,033 | 5/1933 | Liva | 261/122 |
| 2,380,679 | 7/1945 | Smith | 261/122 X |
| 3,396,950 | 8/1968 | Wood | 261/124 X |
| 3,997,634 | 12/1976 | Downs | 261/122 |
| 4,046,845 | 9/1977 | Veeder | 261/122 |
| 4,288,394 | 9/1981 | Ewing et al. | 261/122 |
| 4,631,134 | 12/1986 | Schussler | 261/124 X |

FOREIGN PATENT DOCUMENTS

| | | | |
|---|---|---|---|
| 597951 | 5/1960 | Canada | 261/124 |

*Primary Examiner*—Richard L. Chiesa
*Attorney, Agent, or Firm*—Becker & Becker

[57] ABSTRACT

A device for aerating water. The device includes a rigid support member, and a finely slitted plate of elastomeric material that is disposed on the support member. To prevent the plate from bulging too greatly, and to provide a uniform discharge of air over the entire plate, the thickness of the central portion of the plate is greater than the thickness of the rim portion of the plate, with the thickness of the plate preferably diminishing gradually in the direction toward the rim of the plate.

5 Claims, 1 Drawing Sheet

S U K Z K U S 6 7 8 2 5 1 4 3

DEVICE FOR AERATING WATER

BACKGROUND OF THE INVENTION

The present invention relates to a device for aerating water, especially during purification of water and for waste water. The device includes a rigid, essentially planar support member, and a plate of elastomeric material, such as rubber or rubber-like synthetic material. The plate is disposed on the support member and is provided with fine slits for the release of air. The support member is provided with one or more connectors for supplying air between the support member and the plate. The rim of the plate is connected in an airtight manner to the support member..

With the heretofore known aerating devices of this type, the plate has the same thickness throughout. This fact, as well as the fact that for mechanical reasons the rim portion of the plate must be secured in places to the support member, result in a bulging of the plate under the effect of the internal pressure of the air. In particular, the plate generally bulges to such an extent that it assumes an approximately balloon shape.

This physically unavoidable bulging leads not only to an undesirably great expansion of the plate in the zenith portion of the bulge, but also results in a greater opening of the slits and a smaller water counterpressure at that location. Thus it is impossible to prevent the release of air in the zenith portion from being greater, with the size of the air bubbles also being larger.

It is therefore an object of the present invention to eliminate these drawbacks and to provide a reduced bulging of the plate and a more uniform release of air over the entire surface of the plate.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
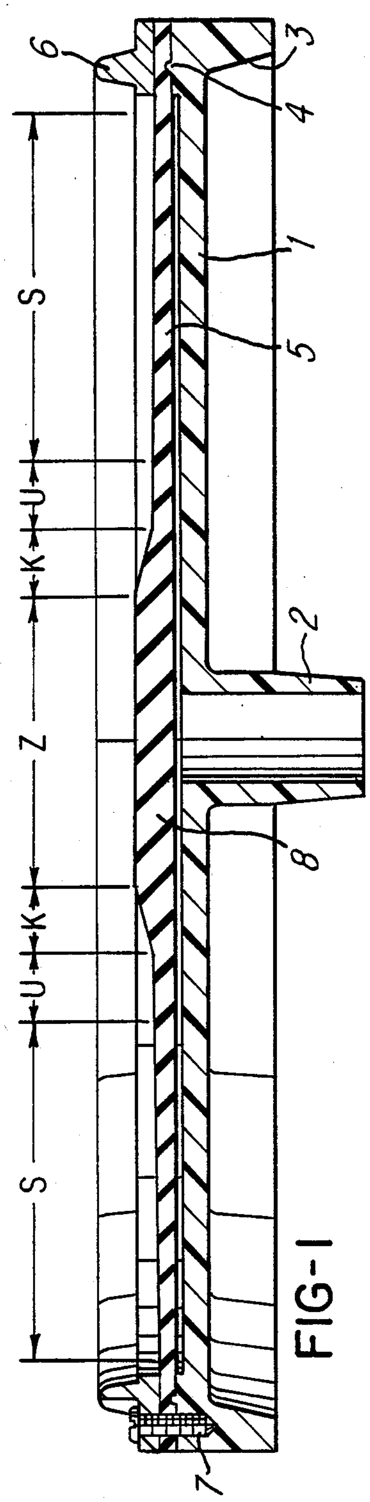
FIG. 1 is a vertical cross-sectional view of one exemplary embodiment of a plate-like water aerating device of the present invention.

The aerating device of the present invention is characterized primarily in that the thickness of the plate in the central portion of the device is greater than the thickness in the rim portion of the plate. The thickness of the plate preferably decreases gradually in the direction toward the rim of the plate. In this connection, it is advantageous that the dimensions of the plate be such that the thickness of the plate in the central portion be approximately two to four times greater than the thickness of the plate in its rim region. The plate is advantageously not provided with any slits in that central region thereof where it has its greatest thickness.

Thus, the ratio of the thickness of the slitted portion to the greatest thickness of the central portion that is not provided with any slits is in a range of approximately 1:2 to 1:4, and more particularly is preferably 1:2.5.

These differences in the thicknesses of the various portions of the plate result in a more uniform bulging, whereupon a correspondingly more uniform release of air is achieved, and in particular in such a way that the small air bubbles have practically the same, small size over the entire slitted portion of the plate.

Further specific features of the present invention will be described in detail subsequently.

DESCRIPTION OF THE PREFERRED EMBODIMENTS

Referring now to the drawing in detail, the illustrated aerating device is disposed horizontally in the water. The inventive aerating device is connected to a common line via a connector 2 that is centrally disposed on the bottom of a rigid support member 1, with a tube or the like being connected to the connector 2. The support member 1 is a flat, disk-like molded body that is made of plastic; the rim of the support member 1 is reinforced by an annular rib 3. Disposed on the slightly raised rim 4 of the support member 1 is a rubber plate 5 that is also circular; the outer periphery of the plate 5 is flush with the support member 1. The rim of the plate 5 is pressed against the rim 4 of the support member 1 by a continuous or closed ring 6 that has an approximately L-shaped cross-sectional shape. The ring 6 is pressed against the rim 4 with the aid of a plurality of screws 7 in such a way that an airtight connection results in the rim portion of the aerating device. It is to be understood that by introducing compressed air into the connector 2, the air can be conveyed to below the plate 5.

The significant part of the present invention is the special configuration of the plate 5. In the central portion Z, the plate 5 is provided with a thick portion 8 that merges via a conical zone K into a transition zone U that is then surrounded by the active region S. The remaining, outwardly disposed, annular rim portion serves for the clamping and securing of the plate 5 to the support member 1.

Figure 2:
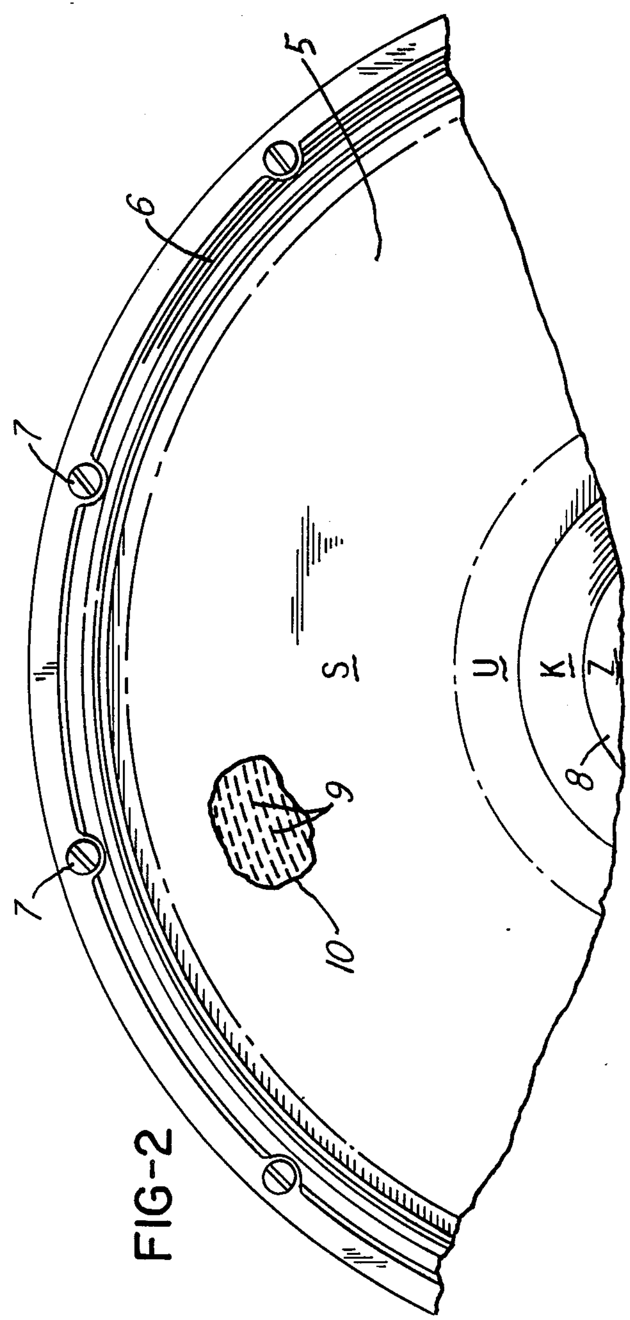
FIG. 2 is a partial plan view of the aerating device of FIG. 1.

The region S is provided with a plurality of fine slits 9; by way of example, these slits 9 are illustrated in the broken-away region 10 of FIG. 2, and are generally disposed upon concentric circles. Under the effect of the internal pressure, the fine slits 9 open in order to be able to release small bubbles into the water. After the internal pressure has been reduced, the slits 9 close again.

The aforementioned inventive configuration of the plate 5 is intended to prevent a non-uniform, balloon-like bulging of the plate 5 of too great a magnitude under the effect of internal air pressure. For this purpose, the central portion Z, which covers the inlet opening of the support member 1 above the connector 2, has a thickness that is approximately two to four times, and preferably 2.5 or 3 times, as great as the average thickness in the region S. By way of example, if the diameter of the plate 5 within the ring 6 is approximately 200 mm, the thickness of the thick portion 8 is approximately 6 mm, whereas the average thickness in the region S is approximately 2.5–2.0 mm. The diameter of the central portion Z is approximately 45 mm, with the conical zone K ending radially outwardly at a diameter of approximately 65 mm. The inner diameter of the active region S is approximately 80 mm, while the radially outer diameter of the region S is disposed just a few millimeters from the inner diameter of the ring 6. It is expedient if from the outer diameter of the conical zone K to the rim of the plate 5 the thickness of the latter gradually decreases from approximately 3 mm to 2 mm.

Although the aforementioned dimensions have been shown to be very advantageous, these dimensions can be altered in indivdual cases as a function of the particular application for which the inventive aerating device is to be used. Nonetheless, it can be said in general that where the aerating device has a circular or approximately circular contour, the outer diameter of the inactive and considerably thicker central portion, which has no slits and covers the centrally disposed connector or connectors 2, should be approximately one third of the outer diameter of the active plate region S, which can be deformed under the effect of the internal pressure. By comparing these two main regions, namely the central portion and the active region, a difference in thickness in a range of approximately 2.5 to 6 results, with the approximately uniform thickness of the central portion being approximately 6 mm, and the average thickness of the region S being approximately 2.5 mm, which results in a ratio of approximately 1:2.5.

The aforementioned rough guide value of approximately 3:1 for the ratio of the considerably thicker central portion Z (including the transition zone) to the slitted, active region S can also apply to devices having a non-circular, for example a square or rectangular, contour. However, a precondition for this configuration is that the air supply bores below the resiliently deformable plate be disposed in the middle.

The present invention is, of course, in no way restricted to the specific disclosure of the specification and drawing, but also encompasses any modifications within the scope of the appended claims.

What I claim is:

1. In a device for aerating water, with said device including a rigid, essentially planar support member and a plate of elastomeric material, such as rubber or rubber-like synthetic material, with said plate being disposed on said support member and being provided with fine slits for the release of air, whereby said support member is provided with one or more connectors for receiving air and supplying same to between said support member and said plate, and whereby the rim of said plate is connected in an airtight manner to said support member, the improvement wherein:

said plate has a central portion, and an outer portion that is disposed between said central portion and said rim of said plate, with said central portion having a thickness that is greater than the thickness of said outer portion, and the thickness of said plate decreases gradually in a direction toward said rim of said plate, the thickness of said central portion of said plate being approximately two to four times greater than the thickness of said outer portion of said plate, and said central portion of said plate is not provided with any of said slits, said one or more connectors of said support member are covered by said central portion of said plate, said central portion of said plate includes a center region, of approximately uniform thickness, adjoined by a conical zone that merges with said outer portin of said plate, and the thickness of said outer portion of said plate decreases slightly in a direction toward said rim of said plate, the thickness of said outer portion decreases from approximately 3 mm to approximately 2 mm.

2. A device according to claim 1, in which at least a portion of said outer portion of said plate is an active region that is provided with said slits; and in which the diameter of said central plate portion is approximately one third of the diameter of said active slitted region of said plate.

3. A device according to claim 2, in which the ratio of the average thickness of said slitted region of said plate to the thickness of said central portion of said plate is approximately 1:2 to 1:4.

4. A device according to claim 3, in which said ratio is approximately 1:2.5.

5. A device according to claim 1, in which the greatest thickness of said central portion of said plate is approximately 6 mm, and the least thickness of said outer portion of said plate is approximately 2 mm.

* * * * *